US012495825B2

(12) United States Patent
Zitturi

(10) Patent No.: US 12,495,825 B2
(45) Date of Patent: Dec. 16, 2025

(54) SHEATHING PAPER WITH USE INDICATOR FOR AEROSOL-GENERATING ARTICLES

(71) Applicant: DELFORTGROUP AG, Traun (AT)

(72) Inventor: Roland Zitturi, Innsbruck (AT)

(73) Assignee: DELFORTGROUP AG, Traun (AT)

( * ) Notice: Subject to any disclaimer, the term of this patent is extended or adjusted under 35 U.S.C. 154(b) by 744 days.

(21) Appl. No.: 17/606,724

(22) PCT Filed: Mar. 26, 2020

(86) PCT No.: PCT/EP2020/058465
§ 371 (c)(1),
(2) Date: Oct. 26, 2021

(87) PCT Pub. No.: WO2020/229037
PCT Pub. Date: Nov. 19, 2020

(65) Prior Publication Data

US 2022/0256913 A1 Aug. 18, 2022

(30) Foreign Application Priority Data

May 15, 2019 (DE) ..................... 10 2019 112 777.7

(51) Int. Cl.
*A24D 1/02* (2006.01)
*A24D 1/20* (2020.01)
(Continued)

(52) U.S. Cl.
CPC ............... *A24D 1/025* (2013.01); *A24D 1/20* (2020.01); *B41M 5/0023* (2013.01); *D21H 19/12* (2013.01); *D21H 27/10* (2013.01)

(58) Field of Classification Search
None
See application file for complete search history.

(56) References Cited

U.S. PATENT DOCUMENTS

2015/0173416 A1* 6/2015 Zitturi ...................... A24D 1/02 131/365
2016/0120214 A1* 5/2016 Volgger ................ A24D 1/025 131/365
(Continued)

FOREIGN PATENT DOCUMENTS

WO WO 2014/037073 A1 3/2014
WO WO 2014/202319 A1 12/2014

OTHER PUBLICATIONS

International Searching Authority/EP, International Search Report and Written Opinion of the International Searching Authority, Application No. PCT/EP2020/058465, dated May 11, 2020, with English translation of the International Search Report, 14 pages.
(Continued)

*Primary Examiner* — Philip Y Louie
*Assistant Examiner* — Madeleine P Delacruz
(74) *Attorney, Agent, or Firm* — Barclay Damon LLP

(57) ABSTRACT

The invention relates to a sheathing paper for aerosol-generating articles, which paper comprises cellulose fibres and onto which paper a composition is applied, which comprises a substance that accelerates the thermal breakdown of cellulose and a binder. Should the mean air permeability of the sheathing paper be 10 $cm^3/(cm^2 \cdot min \cdot kPa)$ or more, said composition is merely applied in some regions, which cover at least 0.5% and at most 70% of the area of the sheathing paper.

43 Claims, 1 Drawing Sheet

(51) Int. Cl.

| | |
|---|---|
| ***B41M 5/00*** | (2006.01) |
| ***D21H 19/12*** | (2006.01) |
| ***D21H 27/10*** | (2006.01) |

(56) References Cited

U.S. PATENT DOCUMENTS

2020/0323258 A1* 10/2020 Sakurai .................. D21H 27/08
2022/0046979 A1* 2/2022 Campitelli ............... A24D 1/02

OTHER PUBLICATIONS

R.R. Baker, Temperature Variation within a Cigarette Combustion Coal during the Smoking Cycle, High Temperature Science 7, 236-247 (1975).

* cited by examiner

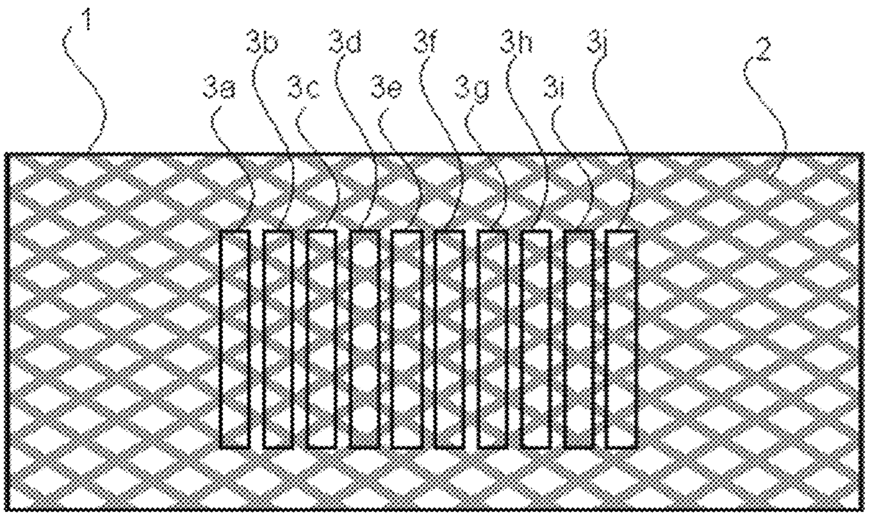
1
3b
3d
3f
3h
3j
2
3a
3c
3e
3g
3i

SHEATHING PAPER WITH USE INDICATOR FOR AEROSOL-GENERATING ARTICLES

CROSS-REFERENCE TO RELATED APPLICATIONS

This application is the national phase entry of International Patent Application No. PCT/EP2020/058465 filed on Mar. 26, 2020, and claims the benefit of German Patent Application No. 10 2019 112 777.7 filed May 15, 2019, the disclosures of which are incorporated herein by reference in their entirety.

FIELD OF THE INVENTION

The invention relates to an aerosol-generating article, wherein the aerosol-generating material is heated and an aerosol is released thereby, but the aerosol-generating material is not burnt. The aerosol-generating article comprises a wrapping paper onto which a substance is applied to the entire surface or to sections of the surface, which causes a change in the optical properties of the wrapping paper and thereby indicates that the aerosol-generating article has been used. In particular, the wrapping paper of the aerosol-generating article according to the invention is designed such that upon heating, its color changes irreversibly at least in sections of the surface, wherein particular attention is paid to the fact that the air permeability of the wrapping paper is little affected. The invention also relates to a process for the manufacture of such a wrapping paper.

BACKGROUND AND PRIOR ART

In the prior art, aerosol-generating articles are known that comprise an aerosol-generating material and a paper, which wraps around the aerosol-generating material and thereby forms a typically cylindrical rod. In this regard, the aerosol-generating material is a material that releases an aerosol upon application of heat, wherein the aerosol-generating material is only heated, but not burnt. In many cases, the aerosol-generating article also comprises a filter that can filter components of the aerosol and which is wrapped with a filter wrapping paper, and by a further wrapping paper that connects the filter to the wrapped rod with the aerosol-generating material.

During the intended use of an aerosol-generating article, it is usual for the aerosol-generating material to be heated, but not burnt. This heating can be carried out, for example, by an external device into which the aerosol-generating article is inserted, or by a heat source applied to one end of the aerosol-generating article, which is operated in order to consume the article, for example by ignition. In many cases, several aerosol-generating articles are present in one pack and often, after use, the used aerosol-generating article is returned to the pack with the still-unused aerosol-generating articles. Because the aerosol-generating material is only heated but not burnt, however, the used aerosol-generating article is not or is only slightly optically distinguished from an unused aerosol-generating article. In any case, the consumer cannot quickly decide which of the aerosol-generating articles are used and which are still unused.

SUMMARY OF THE INVENTION

The objective of the invention is to provide a wrapping paper for aerosol-generating articles that changes irreversibly optically during or shortly after use of the aerosol-generating article, so that the aerosol-generating article can easily be discerned as having been used. Aerosol-generating articles in the context of this invention are rod-shaped articles that comprise an aerosol-generating material and a wrapping paper which wraps the aerosol-generating material, wherein during intended use, the aerosol-generating material is only heated and not burnt. Heating without combustion occurs for typical aerosol-generating materials in any case in which the aerosol-generating material is heated to a temperature of at most 400° C.

This objective is achieved by means of a wrapping paper for an aerosol-generating article according to claim 1, an aerosol-generating article comprising this wrapping paper according to claim 19 and a process for the manufacture of a wrapping paper according to the invention according to claim 21. Advantageous embodiments are provided in the dependent claims.

The inventors have found that this objective can be achieved by means of a wrapping paper onto which a specific composition has been applied to the entire surface or in sections and which, upon heating, causes an irreversible color change of the wrapping paper by accelerating the thermal decomposition of the cellulose. By means of this color change, a used aerosol-generating article can be distinguished from an unused one by simple inspection.

It should be noted that in the prior art, thermochromic inks are known which display a color change if heated above a certain temperature, but which are intentionally not used in the present invention. One reason for this is that the color change of thermochromic inks is often reversible, so that it disappears again during cooling of the aerosol-generating article. In contrast thereto, the decomposition of the cellulose on the wrapping paper according to the invention is in fact irreversible and therefore enables reliable recognition of the used aerosol-generating article, even if some time has passed after its use. Furthermore, the temperature at which the color change occurs for known thermochromic inks is comparatively low, so that even storage of the unused aerosol-generating article at elevated temperatures, for example in a parked car during the summer, can cause a color change, so that an unused article can be erroneously confused with a used one. Furthermore, upon heating of the aerosol-generating article, temperatures of up to 400° C. can be reached for several minutes and at such temperatures, thermochromic inks could already be partially thermally decomposed, so that they lose their function.

In addition, depending on the construction of the aerosol-generating article, air should flow through the wrapping paper into the aerosol-generating material during its use. However, a thermochromic ink applied to the wrapping paper can substantially reduce the air permeability of the wrapping paper, therefore an insufficient amount of such colors is often applied to the wrapping paper so as not to affect the function of the article.

Finally, the substances that may be used for wrapping papers for aerosol-generating articles are substantially limited by law in many countries, so that the use of thermochromic inks, even if they could be used from a technical viewpoint, is often not permitted.

In contrast to the known behavior of thermochromic inks, a particular inventive effect of the invention consists in that the applied substance per se does not change its color, but rather causes a color change of the cellulose in the wrapping paper.

The wrapping paper has to comprise pulp fibers, wherein the pulp fibers are present in the wrapping paper in an amount of at least 50% by mass of the wrapping paper. This amount of pulp fibers is at least that which is necessary to make the color change clearly visible.

The wrapping paper has a mean air permeability of at least 0 cm³/(cm²·min·kPa) and at most 200 cm³/(cm²·min·kPa). In this regard, the air permeability is measured in accordance with ISO 2965:2009 with a measuring head with an open area of 2 mm×15 mm, wherein the mean air permeability is determined from ten measurements at randomly selected positions on the wrapping paper.

The composition applied to the wrapping paper should contain at least one substance that accelerates the thermal decomposition of the cellulose to cause the color change, as well as a binder to fix said substance on or in the paper. In this regard, the substance accelerating the thermal decomposition of cellulose is suitable for causing an irreversible color change of the wrapping paper, perceptible by the naked eye, due to the thermal decomposition of the cellulose in the paper upon heating the wrapping paper to a temperature of at least 130° C. for 5 min.

If the wrapping paper has an air permeability of more than 10 cm³/(cm²·min·kPa), it is important that the air can flow evenly over the surface through the wrapping paper so that larger areas with lower air permeability can be avoided. Such areas of low air permeability can result from the application of the composition.

A sufficient air permeability is ensured according to the invention by applying the composition only in sections of the wrapping paper, wherein the sections cover at least 0.5% and at most 70% of the surface of the wrapping paper. This means that the extent of the total area in which the air permeability is affected is limited, but it is also ensured that the area is sufficiently large so that the color change is readily perceptible.

In addition, the homogeneity of the air permeability is ensured according to the invention in that the sections are shaped in a suitable manner and are arranged on the wrapping paper, wherein the suitable shape or arrangement is judged by two criteria for the purposes of this invention, of which at least one has to be fulfilled. According to the first criterion, if the mean air permeability of the wrapping paper is at least 10 cm³/(cm²·min·kPa) and at most 20 cm³/(cm²·min·kPa), the standard deviation of the air permeability should be at most 6 cm³/(cm²·min·kPa), and if the mean air permeability of the wrapping paper is at least 20 cm³/(cm²·min·kPa) and at most 200 cm³/(cm²·min·kPa), the coefficient of variation of the air permeability should be at most 30%.

To determine the standard deviation and the coefficient of variation of the air permeability, a measuring head with an opening of 2 mm×15 mm is used and the standard deviation and the coefficient of variation are determined from ten non-overlapping sections located close to each other, so that for the determination of the mean value and the standard deviation, an area of about 300 mm² is used. The coefficient of variation is then the quotient of the standard deviation and the mean value and is expressed as percentage. The mean value used in this calculation will in general not be the same as the aforementioned mean air permeability, which is determined from measurements on ten randomly selected positions.

As an alternative or as a complement to the specification of the dispersion parameters of the air permeability, according to a second criterion, at a mean air permeability of at least 10 cm³/(cm²·min·kPa) and at most 200 cm³/(cm²·min·kPa), it is also sufficient if the sections to which the composition is applied to the wrapping paper are shaped such that each imaginary circle with a diameter of D mm on the wrapping paper contains at least one area to which the composition is not applied, wherein the diameter of the circle D in mm is calculated from the mean air permeability x in cm³/(cm²·min·kPa) by $$D = D_{max} - \frac{(D_{max} - D_{min}) \cdot (x - 10)}{190} \text{ and}$$

$$D_{max} = 12 \text{ mm and } D_{min} = 6 \text{ mm.}$$

The effect of this equation is that at a low mean air permeability, for example, 10 cm³/(cm²·min·kPa), the circle can have a comparatively large diameter of 12 mm and thus the sections can contain coarser structures. This is possible because at low air permeabilities, the influence of the sections to which the substance has been applied is less important. At high air permeabilities, for example, 200 cm³/(cm²·min·kPa), the circle may only have a comparatively small diameter of 6 mm and the sections therefore need to have a finer structure, so that air still flows homogeneously through the surface of the wrapping paper.

In summary, the inventors have invented a wrapping paper for aerosol-generating articles, which comprises pulp fibers, wherein at least 50% of the mass of the wrapping paper is formed by pulp fibers, which has a mean air permeability of at least 0 cm³/(cm²·min·kPa) and at most 200 cm³/(cm²·min·kPa), measured with a 2 mm×15 mm measuring head in accordance with ISO 2965:2009 at ten randomly selected positions, to which a composition has been applied which comprises a substance accelerating the thermal decomposition of cellulose and a binder, and wherein, in the case in which the mean air permeability of the wrapping paper is 10 cm³/(cm²·min·kPa) or more, said composition is solely applied in sections which cover at least 0.5% and at most 70% of the surface of the wrapping paper, and wherein said sections in this case, i.e. when the mean air permeability of the wrapping paper is at least 10 cm³/(cm²·min·kPa), are arranged on the wrapping paper such that at least one of the following two criteria (1) and (2) is fulfilled:

(1) if the mean air permeability of the wrapping paper is at least 10 cm³/(cm²·min·kPa) and at most 20 cm³/(cm²·min·kPa), then the standard deviation of the air permeability is at most 6 cm³/(cm²·min·kPa), and if the mean air permeability of the wrapping paper is at least 20 cm³/(cm²·min·kPa) and at most 200 cm³/(cm²·min·kPa), then the coefficient of variation is at most 30%, or (2) the sections to which the composition is applied are shaped such that each imaginary circle with a diameter of D mm on the wrapping paper contains at least one area to which the composition has not been applied, wherein the diameter D in mm is calculated from the mean air permeability x in cm³/(cm²·min·kPa) by $$D = D_{max} - \frac{(D_{max} - D_{min}) \cdot (x - 10)}{190} \text{ wherein}$$

$$D_{max} = 12 \text{ mm and } D_{min} = 6 \text{ mm.}$$

In this regard, the mean air permeability is determined as the mean value of ten measurements at randomly selected positions on the wrapping paper. An individual measurement is carried out in accordance with ISO 2965:2009 with a measuring head with an opening of 2 mm×15 mm. Thus, during the measurement, it is to be ignored that the opening can typically simultaneously comprise areas to which the compositions is applied and areas to which it is not applied.

For the determination of the standard deviation and the coefficient of variation of the air permeability, ten measurements in accordance with ISO 2965:2009 are also carried out with a measuring head with an opening of 2 mm×15 mm, wherein the measurements are carried out on non-overlapping sections located close to each other, so that for the determination of the mean value and the standard deviation, an area of about 300 $mm^2$ is used. The coefficient of variation is then the quotient of the standard deviation and the mean value of the so-determined measured values and is expressed as a percentage. Preferably, the individual measurement sections are arranged such that their longer sides, that is, the 15 mm long sides, are lying parallel right next to each other with a small distance in between, preferably at most 2 mm.

Typical wrapping papers for aerosol-generating articles that are not in accordance with the invention with a natural homogeneous air permeability over the entire surface have a coefficient of variation determined in this manner of at most 15%. On the other hand, wrapping papers to which a composition has been applied to larger sections can achieve coefficients of variation of the air permeability of 50% to 80%. This holds in particular if the composition is film-forming and therefore seals the pores of the wrapping paper or the composition is applied in the shape of bands of several millimeters width.

The wrapping paper preferably has a basis weight of at least 15 $g/m^2$, particularly preferably of at least 18 $g/m^2$ and more particularly preferably of at least 20 $g/m^2$. Such a basis weight provides the wrapping paper with a tensile strength that is advantageous for the further processing of the wrapping paper to an aerosol-generating article.

The wrapping paper preferably has a basis weight of at most 100 $g/m^2$, particularly preferably of at most 60 $g/m^2$ and in particular of at most 45 $g/m^2$. The basis weight is preferably not so high that restoring forces make wrapping the aerosol-generating material difficult during manufacture of the aerosol-generating article.

The basis weight of the wrapping paper includes the applied composition and can be determined in accordance with ISO 536:2012.

The wrapping paper contains pulp fibers, wherein the pulp fibers make up at least 50% of the mass of the wrapping paper and preferably at least 60% of the mass of the wrapping paper and particularly preferably at least 65% of the mass of the wrapping paper. The pulp fibers are required so that the effect of the substance accelerating the thermal decomposition of cellulose is easily optically perceptible due to the color change.

The pulp fibers are sourced from one or more plants that are selected from the group consisting of coniferous trees, deciduous trees, spruce, pine, fir, beech, birch, eucalyptus, flax, hemp, jute, ramie, abacá, sisal, kenaf and cotton. All or part of the pulp fibers may also be fibers from regenerated cellulose, such as Tencel™ fibers, Lyocell™ fibers, viscose fibers or Modal™ fibers.

Preferably, the pulp fibers are at least partially bleached, because the white color of the bleached pulp fibers makes the color change more easily perceptible. The proportion of unbleached pulp fibers, which usually have a light brown to dark brown color, should preferably be at most 50% of the mass of pulp fibers.

The wrapping paper according to the invention can also contain one or more fillers. The total amount of fillers is preferably at most 40%, particularly preferably at least 10% and at most 38% and in particular at least 20% and at most 35% of the mass of the wrapping paper. The proportion of fillers can favorably affect the air permeability, color and opacity of the wrapping paper, so that the color change upon heating of an aerosol-generating article manufactured therefrom is easily perceptible.

The filler or fillers are preferably white, water-insoluble particles and can particularly preferably be selected from the group consisting of calcium carbonate, magnesium carbonate, magnesium oxide, magnesium hydroxide, aluminum hydroxide, talc, kaolin and titanium dioxide.

The wrapping paper can contain further substances that are required for the manufacture of the wrapping paper or which endow the wrapping paper with further special properties. Examples of such substances are pigments, colorants, sizing agents, starch, retention aids or processing aids and can be selected by the skilled person with regard to type and amount by his experience.

Outside the sections to which the composition has been applied, the wrapping paper preferably does not contain any substance accelerating the decomposition of the cellulose, or solely in an amount, which does not exceed 0.5% of the mass of wrapping paper, particularly preferably 0.25% of the mass of the wrapping paper and in particular 0.1% of the mass of the wrap per unit area. Higher proportions of these substances would make it more difficult to detect the color change of the wrapping paper in comparison to the sections to which said composition has been applied.

A composition that comprises a binder and a substance accelerating the thermal decomposition of cellulose is applied to the entire surface or to sections of the wrapping paper.

The amount of binder which is applied to sections of the wrapping paper should be rather small, because the binder reduces the air permeability and increases the coefficient of variation of the air permeability. The amount of binder that is applied in sections is preferably at most 15%, particularly preferably at most 10% and in particular at most 5% of the mass of wrapping paper per unit area.

The binder is preferably selected from the group consisting of starch, starch derivatives, cellulose derivatives, carboxy methyl cellulose, alginates, pectins, polyvinyl alcohol, guar, gum Arabic or mixtures thereof.

The substance accelerating the thermal decomposition of cellulose is preferably contained, in the areas of the wrapping paper to which the composition containing it is applied, in an amount of at least 0.2 $g/m^2$ and at most 8.0 $g/m^2$, particularly preferably of at least 0.3 $g/m^2$ and at most 7.0 $g/m^2$ and more particularly preferably of at least 0.5 $g/m^2$ and at most 5.0 $g/m^2$. The amount of the substance accelerating the thermal decomposition of cellulose is selected herein such that a color change is particularly easily perceptible, in particular by the naked eye, even in poor lighting conditions.

Alternatively and preferably, the amount of the applied substance accelerating the thermal decomposition of cellulose can be characterized in respect of the quantitative ratio of the amount of the pulp fibers contained in the wrapping paper. This quantitative ratio is important because, according to the invention, the substance has to act on the pulp fibers. The quantitative ratio of the amount of said substance in $g/m^2$ with respect to the area to which the composition containing it is applied and the amount of pulp fibers in the wrapping paper in $g/m^2$ is preferably at least 0.05 and at most 0.45, particularly preferably at least 0.06 and at most 0.30 and in particular at least 0.07 and at most 0.25. The most advantageous ratio in each case depends on the specific substance accelerating the thermal decomposition of cellulose.

The substance accelerating the thermal decomposition of cellulose is preferably one or more of the chemical compounds selected from the group consisting of citrates, malates, tartrates, acetates, nitrates, succinates, fumarates, gluconates, glycolates, lactates, oxylates, salicylates, α-hydroxy caprylates, hydrogen carbonates, carbonates, chlorides, polyphosphates, phosphonates and phosphates and particularly preferably one or more of the chemical compounds selected from the group consisting of trisodium citrate, tripotassium citrate, monoammonium phosphate, sodium acetate, potassium acetate, sodium hydrogen carbonate, potassium hydrogen carbonate, sodium carbonate, potassium carbonate, sodium tartrate, potassium sodium tartrate, potassium formate, sodium formate, sodium nitrate and potassium nitrate. More particularly preferably, the substance is one or more of the chemical compounds selected from the group consisting of tripotassium citrate, monoammonium phosphate, sodium hydrogen carbonate, sodium acetate and potassium carbonate. The particularly preferred chemical compounds cause a particularly clear color change of the cellulose, as they support the formation of char particularly well.

If the mean air permeability of the wrapping paper is at least 10 $cm^3/(cm^2 \cdot min \cdot kPa)$ and at most 200 $cm^3/(cm^2 \cdot min \cdot kPa)$, then the sections in which said composition has been applied are shaped such that they make up at least 0.5% and at most 70%, preferably at least 1% and at most 60%, particularly preferably at least 1% and at most 20% and more particularly preferably at least 1% and at most 10% of the surface of the wrapping paper.

If the mean air permeability of the wrapping paper is at least 10 $cm^3/(cm^2 \cdot min \cdot kPa)$ and at most 200 $cm^3/(cm^2 \cdot min \cdot kPa)$, then the sections must be shaped such that at least one of the following two criteria (3), (4) is fulfilled:

(3) if the mean air permeability of the wrapping paper is greater than 10 $cm^3/(cm^2 \cdot min \cdot kPa)$ and less than 20 $cm^3/(cm^2 \cdot min \cdot kPa)$, then the standard deviation of the air permeability is at most 6 $cm^3/(cm^2 \cdot min \cdot kPa)$, preferably at most 5.5 $cm^3/(cm^2 \cdot min \cdot kPa)$ and particularly preferably at most 5 $cm^3/(cm^2 \cdot min \cdot kPa)$, and if the mean air permeability of the wrapping paper is at least 20 $cm^3/(cm^2 \cdot min \cdot kPa)$ and at most 200 $cm^3/(cm^2 \cdot min \cdot kPa)$, then the coefficient of variation of the air permeability is at most 30%, preferably at most 27.5% and in particular at most 25%, or (4) the sections to which the composition is applied are shaped such that each imaginary circle with a diameter of D mm on the wrapping paper contains at least one area to which the composition has not been applied, wherein the diameter D in mm can be calculated from the mean air permeability x in $cm^3/(cm^2 \cdot min \cdot kPa)$ by $$D = D_{max} - \frac{(D_{max} - D_{min}) \cdot (x - 10)}{190}$$

and wherein $D_{max}$=12 mm and $D_{min}$=6 mm, preferably $D_{max}$=10 mm and $D_{min}$=5 mm and particularly preferably $D_{max}$=8 mm and $D_{min}$=4 mm and more particularly preferably $D_{max}$=6 mm and $D_{min}$=3 mm.

If the mean air permeability of the wrapping paper is at least 0 $cm^3/(cm^2 \cdot min \cdot kPa)$ and at most 10 $cm^3/(cm^2 \cdot min \cdot kPa)$, the composition can be applied to the entire surface or in sections. In the case of application to sections, the sections to which the composition is applied to the wrapping paper are preferably shaped such that each imaginary circle on the wrapping paper with a diameter of 12 mm, particularly preferably with a diameter of 10 mm and in particular with a diameter of 8 mm contains at least one area to which the composition is not applied.

If the mean air permeability of the wrapping paper is at least 0 $cm^3/(cm^2 \cdot min \cdot kPa)$ and at most 10 $cm^3/(cm^2 \cdot min \cdot kPa)$ and the composition is only applied in sections, then the sections to which said composition is applied are shaped such that they preferably make up at least 0.5% and at most 70%, particularly preferably at least 1% and at most 60% and in particular at least 1% and at most 20% and particularly at least 1% and at most 10% of the surface of the wrapping paper.

The smaller the area to which the composition is applied, the less will the air permeability of the wrapping paper be influenced with respect to its mean value and its coefficient of variation, but on the other hand, the individual sections in which the color change is visible will also become smaller thereby and thus it will become more difficult to recognize that the aerosol-generating article manufactured therefrom has already been used.

The criteria (3) and (4) are not equivalent in their effect, which means that the fulfillment of one of the criteria does not necessarily cause the other criterion to be fulfilled, but each is by itself enough to obtain a wrapping paper according to the invention which is well suited for use on aerosol-generating articles. The same holds for the aforementioned criteria (1) and (2).

The aerosol-generating article according to the invention is rod-shaped and comprises an aerosol-generating material and the wrapping paper according to the invention, wherein the wrapping paper wraps the aerosol-generating material and wherein during the intended use of the aerosol-generating article, the aerosol-generating material is only heated, but not burnt.

In a preferred embodiment of the aerosol-generating article, the aerosol-generating material is heated to a maximum temperature of at least 120° C. and at most 500° C. and particularly preferably to a maximum temperature of at least 200° C. and at most 400° C.

In a preferred embodiment, the aerosol-generating article additionally contains a filter.

The wrapping paper according to the invention can be manufactured in a process according to the invention comprising the following steps A-C:

A—providing a base wrapping paper,

B—applying a composition to the base wrapping paper, and

C—drying the wrapping paper obtained in step B, wherein the wrapping paper obtained in step C comprises pulp fibers, wherein at least 50% of the mass of the wrapping paper is formed by pulp fibers, and the wrapping paper obtained in step C has a mean air permeability of at least 0 $cm^3/(cm^2 \cdot min \cdot kPa)$ and at most 200 $cm^3/(cm^2 \cdot min \cdot kPa)$, measured with a 2 mm×15 mm measuring head in accordance with ISO 2965:2009, and in step B, a composition is applied which comprises a substance accelerating the thermal decomposition of cellulose and a binder, and which, if the mean air permeability of the wrapping paper obtained in step C is at least 10 $cm^3/(cm^2 \cdot min \cdot kPa)$ and at most 200 $cm^3/(cm^2 \cdot min \cdot kPa)$, is applied in step B to areas which cover at least 0.5% and at most 70% of the surface of the wrapping paper, and wherein, if the mean air permeability of the wrapping paper obtained in step C is at least 10 $cm^3/(cm^2 \cdot min \cdot kPa)$ and at most 200 $cm^3/(cm^2 \cdot min \cdot kPa)$, the wrapping paper obtained in step C fulfills at least one of the following two criteria (1), (2):

(1) if the mean air permeability of the wrapping paper obtained in step C is at least 10 $cm^3/(cm^2 \cdot min \cdot kPa)$ and at most 20 $cm^3/(cm^2 \cdot min \cdot kPa)$, then the standard deviation of the air permeability is at most 6 $cm^3/(cm^2 \cdot min \cdot kPa)$, and if the mean air permeability of the wrapping paper obtained in step C is at least 20 $cm^3/(cm^2 \cdot min \cdot kPa)$ and at most 200 $cm^3/(cm^2 \cdot min \cdot kPa)$, then the coefficient of variation of the air permeability is at most 30%, or (2) the sections to which the composition is applied in step B are shaped such that each imaginary circle with a diameter of D mm on the wrapping paper contains at least one area to which the composition is not applied, wherein the diameter D in mm is calculated from the mean air permeability x in $cm^3/(cm^2 \cdot min \cdot kPa)$ of the wrapping paper obtained in step C by $$D = D_{max} - \frac{(D_{max} - D_{min}) \cdot (x - 10)}{190} \text{ and}$$

$$D_{max} = 12 \text{ mm and } D_{min} = 6 \text{ mm.}$$

With regard to the properties and components of the wrapping paper obtained in step C, the same necessary, preferred, particularly preferred and more particularly preferred ranges of values and properties apply as have already been mentioned for the wrapping paper according to the invention. This holds in particular for the basis weight, the standard deviation and the coefficient of variation of the air permeability, the type and amount of pulp fiber, the type and amount of fillers and the design of the sections to which the composition is applied, for example with respect to their proportion of the total surface of the wrapping paper and the selection of the parameters $D_{max}$ and $D_{min}$.

The composition that is applied in step B comprises a substance accelerating the thermal decomposition of cellulose, a binder and a solvent, wherein the solvent is preferably water.

The substance in the composition in step B which accelerates the thermal decomposition of cellulose is a chemical compound or a mixture of two or more chemical compounds and preferably dissolves in the solvent of the composition.

The substance accelerating the thermal decomposition of cellulose contained in the composition of step B is preferably one or more of the chemical compounds selected from the group consisting of citrates, malates, tartrates, acetates, nitrates, succinates, fumarates, gluconates, glycolates, lactates, oxylates, salicylates, α-hydroxy caprylates, hydrogen carbonates, carbonates, chlorides, polyphosphates, phosphonates, and phosphates and particularly preferably one or more of the chemical compounds selected from the group consisting of trisodium citrate, tripotassium citrate, monoammonium phosphate, sodium acetate, potassium acetate, sodium hydrogen carbonate, potassium hydrogen carbonate, sodium carbonate, potassium carbonate, sodium tartrate, potassium sodium tartrate, potassium formate, sodium formate, sodium nitrate and potassium nitrate. More particularly preferably, the substance is one or more of the chemical compounds selected from the group consisting of tripotassium citrate, monoammonium phosphate, sodium hydrogen carbonate, sodium acetate and potassium carbonate.

The composition which is applied to the base wrapping paper in step B contains the substance accelerating the thermal decomposition of cellulose in an amount which is preferably at least 3% and at most 30%, particularly preferably at least 4% and at most 25% and in particular at least 5% and at most 20%, respectively with respect to the mass of the composition.

The binder in the composition of step B is preferably selected from the group consisting of starch, starch derivatives, cellulose derivatives, carboxy methyl cellulose, alginates, pectins, polyvinyl alcohol, guar, gum Arabic or mixtures thereof.

The composition which is applied to the base wrapping paper in step B contains the binder in an amount which is preferably at least 0.1% and at most 15%, particularly preferably at least 0.3% and at most 12% and in particular at least 0.5% and at most 10%, each with respect to the amount of the composition. The amount of binder in this regard also depends on the requirements of the application process in step B, in particular with respect to the viscosity of the composition.

During drying in step C, the solvent is substantially removed from the composition and the applied, dried composition is then applied in an amount which is preferably at least 0.2 $g/m^2$ and at most 8 $g/m^2$, particularly preferably at least 0.5 $g/m^2$ and at most 6 $g/m^2$ and in particular at least 1 $g/m^2$ and at most 5 $g/m^2$ with respect to the area onto which the composition has actually been applied.

The application in step B can be carried out by various processes, wherein printing and spraying are preferred and rotogravure printing and flexographic printing are particularly preferred.

The drying process in step C can be carried out by various processes, preferably by contact with one or more heated cylinders, contact with hot air, infra-red radiation, microwave radiation and combinations thereof.

In a particularly preferred embodiment of the process according to the invention, after step C, it comprises the additional steps D and E, wherein in step D, water is applied to the entire surface of the wrapping paper obtained in step C and in step E, the wrapping paper from step D is dried, more particularly preferably by contact with one or more heated cylinders. During application of the composition in step B, in particular if the solvent contains water, wrinkles may occur after drying in step C. Through the steps D and E of this particularly preferred embodiment of the process according to the invention, such wrinkles can be significantly reduced or entirely avoided.

BRIEF DESCRIPTION OF THE FIGURE

FIG. 1 shows, by way of example, a wrapping paper and the positions at which the ten measurements for the determination of the standard deviation and the coefficient of variation of the air permeability can be carried out.

DESCRIPTION OF THE PREFERRED EMBODIMENTS

In the following, some preferred embodiments of wrapping papers according to the invention are described.

As the base wrapping paper in step A of the process according to the invention, two papers designated as base wrapping paper A and base wrapping paper B were used.

Base wrapping paper A had a basis weight of 29 $g/m^2$ and contained 69% wood pulp fibers and 31% precipitated calcium carbonate as filler. The percentages in this regard refer to the mass of the base wrapping paper. The wood pulp fibers were a mixture of pulp fibers sourced from coniferous trees and deciduous trees. Base wrapping paper A had a mean air permeability of 60.1 $cm^3/(cm^2 \cdot min \cdot kPa)$, wherein the air permeability was measured in accordance with ISO 2965:2009 with a measuring head with an opening of 2 mm×15 mm at ten randomly selected positions, and the mean value was calculated from these ten measurements.

Base wrapping paper B had a basis weight of 24 $g/m^2$ and contained 71% wood pulp fibers and 29% precipitated calcium carbonate as filler. The percentages in this regard refer to the mass of the base wrapping paper. The wood pulp fibers were a mixture of pulp fibers sourced from coniferous trees and deciduous trees. Base wrapping paper B had a mean air permeability of 74.8 $cm^3/(cm^2 \cdot min \cdot kPa)$, wherein the air permeability was measured in accordance with ISO 2965:2009 with a measuring head with an opening of 2 mm×15 mm at ten randomly selected positions, and the mean value was calculated from these ten measurements.

Different compositions were applied by rotogravure printing to the base wrapping papers A and B in sections in the form of a pattern of crossing lines, 1.5 mm wide, so that the sections to which the composition was applied made up about 40% of the area of the base wrapping paper.

The amount of composition which was applied in the sections was 30 $g/m^2$ for base wrapping paper A and 25 $g/m^2$ for base wrapping paper B with respect to the area to which the composition was actually applied.

The wrapping papers were then dried in accordance with step C of the process according to the invention.

The parameters relevant for the manufacture of the wrapping papers are provided in Table 1. The column "No." indicates the number of the wrapper, the column "BP" indicates which base wrapping paper was used for the manufacture. Under the column "Composition", the binder and the substance accelerating the thermal decomposition of cellulose are provided as a % with respect to the mass of the composition. The type of the binder is provided, wherein "CMC" means carboxy methyl cellulose and "St" means starch. The type of substance is also provided, wherein "TKZ" means tripotassium citrate, "MAP" means monoammonium phosphate, "NaAc" means sodium acetate and "KCrb" means potassium carbonate. Under the column "Wrapping Paper", the amount of binder and the substance accelerating the thermal decomposition of cellulose are provided in $g/m^2$ and as a % with respect to the basis weight of the wrapping paper, as well as the ratio "V" of the amount of said substance in $g/m^2$ to the amount of pulp fibers in the wrapping paper in $g/m^2$.

| | | Composition | | | | Wrapping Paper | | | | |
|---|---|---|---|---|---|---|---|---|---|---|
| | | Binder | | Substance | | Binder | | Substance | | |
| No. | BP | % | Art | % | Art | g/m² | % | g/m² | % | V |
| 1 | A | 0.71 | CMC | 5.0 | TKZ | 0.21 | 0.69 | 1.50 | 4.88 | 0.07 |
| 2 | A | 0.68 | CMC | 8.7 | TKZ | 0.20 | 0.64 | 2.61 | 8.20 | 0.13 |
| 3 | A | 0.70 | CMC | 10.0 | TKZ | 0.21 | 0.65 | 3.00 | 9.31 | 0.15 |
| 4 | A | 0.65 | CMC | 12.0 | TKZ | 0.20 | 0.59 | 3.60 | 10.98 | 0.18 |
| 5 | A | 0.63 | CMC | 14.8 | TKZ | 0.19 | 0.56 | 4.44 | 13.20 | 0.22 |
| 6 | A | 0.71 | CMC | 5.0 | MAP | 0.21 | 0.69 | 1.50 | 4.88 | 0.07 |
| 7 | A | 0.68 | CMC | 8.7 | MAP | 0.20 | 0.64 | 2.61 | 8.20 | 0.13 |
| 8 | A | 0.70 | CMC | 10.0 | MAP | 0.21 | 0.65 | 3.00 | 9.31 | 0.15 |
| 9 | A | 0.65 | CMC | 12.0 | MAP | 0.20 | 0.59 | 3.60 | 10.98 | 0.18 |
| 10 | A | 0.63 | CMC | 14.8 | MAP | 0.19 | 0.56 | 4.44 | 13.20 | 0.22 |
| 11 | A | 0.70 | CMC | 5.0 | NaAc | 0.21 | 0.68 | 1.50 | 4.88 | 0.07 |
| 12 | A | 0.70 | CMC | 10.0 | NaAc | 0.21 | 0.65 | 3.00 | 9.31 | 0.15 |

-continued

| | | Composition | | | | Wrapping Paper | | | | |
|---|---|---|---|---|---|---|---|---|---|---|
| | | Binder | | Substance | | Binder | | Substance | | |
| No. | BP | % | Art | % | Art | g/m² | % | g/m² | % | V |
| 13 | B | 0.75 | CMC | 10.0 | KCrb | 0.19 | 0.70 | 2.50 | 9.37 | 0.15 |
| 14 | B | 0.75 | CMC | 25.0 | KCrb | 0.19 | 0.62 | 6.25 | 20.53 | 0.37 |
| 15 | B | 0.70 | CMC | 30.0 | KCrb | 0.18 | 0.55 | 7.50 | 23.68 | 0.44 |
| 16 | B | 5.00 | St | 8.0 | KCrb | 1.25 | 4.59 | 2.00 | 7.34 | 0.12 |
| 17 | B | 5.00 | St | 25.0 | KCrb | 1.25 | 3.97 | 6.25 | 19.84 | 0.37 |
| 18 | B | 5.00 | CMC | 25.0 | KCrb | 1.25 | 3.97 | 6.25 | 19.84 | 0.37 |

As for the base wrapping papers A and B the air permeability was measured at ten randomly selected positions in accordance with ISO 2965:2009 with a measuring head with an opening of 2 mm×15 mm and the mean value was calculated therefrom. For the wrapping papers 1 to 12, which were manufactured from base wrapping paper A, a mean air permeability between 42 $cm^3/(cm^2 \cdot min \cdot kPa)$ and 48 $cm^3/(cm^2 \cdot min \cdot kPa)$ was found, while the mean air permeability of the wrapping papers 13 to 18, which were manufactured from base wrapping paper B, was between 50 $cm^3/(cm^2 \cdot min \cdot kPa)$ and 55 $cm^3/(cm^2 \cdot min \cdot kPa)$.

For the test of the criteria (1) or (3), the coefficient of variation of the air permeability was determined in accordance with ISO 2965:2009 with a measuring head with an opening of 2 mm×15 mm. The measurement method is explained with reference to FIG. 1. With the wrapping paper 1 in FIG. 1, the composition is applied in the shape of crossing lines 2 and the measuring head with an opening of 2 mm×15 mm was placed at ten positions 3*a* to 3*j* next to each other, wherein the individual positions were each shifted by 3 mm, so that a distance of 1 mm was between the areas. The air permeability was measured on each of the positions 3*a* to 3*j*. From that, the mean value and the standard deviation were determined and the coefficient of variation was calculated. For the wrapping papers 1 to 12 which were manufactured from base wrapping paper A, coefficients of variation of between 10% and 15% were obtained and for the wrapping papers 13 to 18 which were manufactured from base wrapping paper B, the coefficients of variation were between 12% and 17%, so that the criteria (1) and (3) are fulfilled.

For the test of criteria (2) and (4), the diameter of the imaginary circle was determined for each of the wrapping papers 1 to 18 based on the measured mean air permeability.

For the wrapping papers 1 to 12, which were manufactured from base wrapping paper A, based on a mean air permeability of 42 $cm^3/(cm^2 \cdot min \cdot kPa)$ to 48 $cm^3/(cm^2 \cdot min \cdot kPa)$, the result was a diameter of the circle from $$D = 12 - \frac{(12-6)\cdot(42-10)}{190} = 11.0 \text{ mm}$$

to $$D = 12 - \frac{(12-6)\cdot(48-10)}{190} = 10.8 \text{ mm}$$

For the wrapping papers 13 to 18 which were manufactured from base wrapping paper B, based on a mean air permeability of 50 $cm^3/(cm^2 \cdot min \cdot kPa)$ to 55 $cm^3/(cm^2 \cdot min \cdot kPa)$, the result was a diameter of the circle from $$D = 12 - \frac{(12-6)\cdot(50-10)}{190} = 10.7 \text{ mm}$$

-continued to $$D = 12 - \frac{(12-6)\cdot(55-10)}{190} = 10.6\ \text{mm}$$

The pattern with 1.5 mm wide crossing lines obviously fulfills the requirements of criteria (2) and (4) and thus these criteria are fulfilled for all wrapping papers 1 to 18.

The wrapping papers 1 to 18 were heated to 130° C. for 5 minutes. After just one minute, a change in color was discernible on the wrapping papers 1, 3, 6, 8, 11, 12, 13 and 17. After 5 minutes, all of the wrapping papers according to the invention showed a significant, irreversible color change to yellowish colors in the sections to which the composition was applied, and for longer periods of heating to light brown to dark brown colors, which can be clearly discerned from the unchanged or hardly changed color outside of these sections.

Aerosol-generating articles according to the prior art were manufactured from the wrapping papers which were heated in a heating device, as intended. After removing the aerosol-generating articles from the heating device, a distinct color change could be discerned in the printed sections, so that used and unused aerosol-generating articles were clearly discernible from each other.

The invention claimed is:

1. Wrapping paper for aerosol-generating articles, which comprises pulp fibers, wherein at least 50% of the mass of the wrapping paper is formed by the pulp fibers, said wrapping paper comprising a composition that is applied thereto which comprises a substance accelerating the thermal decomposition of cellulose and a binder, wherein the substance accelerating the thermal decomposition of cellulose is capable of causing an irreversible color change of the wrapping paper due to the thermal decomposition of cellulose in the paper which is discernible by the naked eye upon heating the wrapping paper to a temperature of at least 130° C. for 5 min, in which the substance accelerating the thermal decomposition of cellulose is contained in an amount of at least 0.2 g/m$^2$ and at most 8.0 g/m$^2$ in the areas of the wrapping paper to which said composition has been applied, wherein the substance accelerating the thermal decomposition of cellulose is one or more of the chemical compounds selected from the group consisting of citrates, malates, tartrates, acetates, nitrates, succinates, fumarates, gluconates, glycolates, lactates, oxylates, salicylates, α-hydroxy caprylates, hydrogen carbonates, carbonates, chlorides, polyphosphates, phosphonates, phosphates and combinations thereof, wherein said composition is only applied in sections which cover at least 0.5% and at most 70% of the surface of the wrapping paper, wherein said binder reduces the air permeability of the wrapping paper in said sections, wherein said wrapping paper, including the composition applied thereto in said sections, has a mean air permeability of at least 10 cm$^3$/(cm$^3$·min·kPa) and at most 200 cm$^3$/(cm$^2$·min·kPa), measured with a 2 mm×15 mm measuring head in accordance with ISO 2965:2009 at ten randomly selected positions, and wherein said sections are arranged on the wrapping paper such that the following criterion (1) is fulfilled:

(1) if the mean air permeability of the wrapping paper is at least 10 cm$^3$/(cm$^2$·min·kPa) and at most 20 cm$^3$/(cm$^2$·min·kPa), then the standard deviation of the air permeability is at most 6 cm$^3$/(cm$^2$·min·kPa), wherein the standard deviation is determined from ten measurements with said 2 mm×15 mm measuring head on non-overlapping areas located close to each other, and if the mean air permeability of the wrapping paper is at least 20 cm$^3$/(cm$^2$·min·kPa) and at most 200 cm$^3$/(cm$^2$·min·kPa), then the coefficient of variation of the air permeability is at most 30%, wherein the coefficient of variation is defined as the quotient of said standard deviation and the mean value of the ten measurements from which the standard deviation is determined, thereby leading to a substantially homogeneous airflow through said wrapping paper.

2. Wrapping paper according to claim 1, which has a basis weight of at least 15 g/m$^2$ and at most 45 g/m$^2$.

3. Wrapping paper according to claim 1, in which the pulp fibers make up at least 60% of the mass of the wrapping paper.

4. Wrapping paper according to claim 1, in which at least a portion of the pulp fibers is bleached, wherein the proportion of unbleached pulp fibers is at most 50% of the mass of the pulp fibers.

5. Wrapping paper according to claim 1, which contains one or more fillers, wherein the total amount of filler makes up at least 10% and at most 38% of the mass of the wrapping paper.

6. Wrapping paper according to claim 1, which does not contain substances accelerating the decomposition of the cellulose outside the sections to which the composition has been applied, or solely in an amount which does not exceed 0.5% of the mass of the wrapping paper per unit area.

7. Wrapping paper according to claim 1, in which the amount of binder which is applied in sections of the wrapping paper is at most 5% of the mass of the wrapping paper per unit area.

8. Wrapping paper according to claim 1, in which the ratio of the amount of the substance accelerating the thermal decomposition of cellulose in g/m$^2$ with respect to the area to which the composition containing it has been applied and the amount of pulp fibers in the wrapping paper in g/m$^2$ is at least 0.05 and at most 0.45.

9. Wrapping paper according to claim 1, wherein the sections to which said composition is applied are shaped such that they make up at least 1% and at most 60% of the surface of the wrapping paper.

10. Wrapping paper according to claim 1 in which the sections are shaped such that the following criterion (2) is fulfilled:

(2) if the mean air permeability of the wrapping paper is greater than 10 cm$^3$/(cm$^2$·min·kPa) and less than 20 cm$^3$/(cm$^2$·min·kPa), then the standard deviation of the air permeability is at most 5.5 cm$^3$/(cm$^2$·min·kPa), and if the mean air permeability of the wrapping paper is at least 20 cm$^3$/(cm$^2$·min·kPa) and at most 200 cm$^3$/(cm$^2$·min·kPa), then the coefficient of variation of the air permeability is at most 25%.

11. Wrapping paper according to claim 6, which does not contain substances accelerating the decomposition of the cellulose outside the sections to which the composition has been applied, or solely in an amount which does not exceed 0.1% of the mass of the wrapping paper per unit area.

12. Wrapping paper according to claim 1, in which the substance accelerating the thermal decomposition of cellulose is contained in an amount of at least 0.5 g/m$^2$ and at most 5.0 g/m$^2$ in the areas of the wrapping paper to which the composition containing the same has been applied.

13. Wrapping paper according to claim 1, in which the ratio of the amount of the substance accelerating the thermal decomposition of cellulose in $g/m^2$ with respect to the area to which the composition containing it has been applied and the amount of pulp fibers in the wrapping paper in $g/m^2$ is at least 0.07 and at most 0.25.

14. Wrapping paper according to claim 1, wherein the substance accelerating the thermal decomposition of cellulose is one or more of the chemical compounds selected from the group consisting of trisodium citrate, tripotassium citrate, monoammonium phosphate, sodium acetate, potassium acetate, sodium hydrogen carbonate, potassium hydrogen carbonate, sodium carbonate, potassium carbonate, sodium tartrate, potassium sodium tartrate, potassium formate, sodium formate, sodium nitrate, potassium nitrate, and combinations thereof.

15. Wrapping paper according to claim 1, wherein, in the case in which the mean air permeability of the wrapping paper is at least 10 $cm^3/(cm^2 \cdot min \cdot kPa)$ and at most 200 $cm^3/(cm^2 \cdot min \cdot kPa)$, the sections to which said composition is applied are shaped such that they make up at least 1% and at most 10% of the surface of the wrapping paper.

16. Wrapping material according to claim 1, in which, in the case in which the mean air permeability of the wrapping paper is at least 0 $cm^3/(cm^2 \cdot min \cdot kPa)$ and at most 10 $cm^3/(cm^2 \cdot min \cdot kPa)$ and the composition is only applied in sections, the sections to which said composition is applied are shaped such that they make up at least 1% and at most 20% of the surface of the wrapping paper.

17. Rod-shaped, aerosol-generating article which comprises an aerosol-generating material and a wrapping paper according to claim 1, wherein said wrapping paper wraps the aerosol-generating material and wherein the aerosol-generating material is configured to be heated, but not burnt, wherein said aerosol generating material is configured to release an aerosol heating to a temperature of 400° C. or less, wherein said wrapping paper comprises pulp fibers, wherein at least 50% of the mass of the wrapping paper is formed by the pulp fibers, which has a mean air permeability of at least 0 $cm^3/(cm^2 \cdot min \cdot kPa)$ and at most 200 $cm^3/(cm^2 \cdot min \cdot kPa)$, measured with a 2 mm×15 mm measuring head in accordance with ISO 2965:2009 at ten randomly selected positions, and to which a composition is applied which comprises a substance accelerating the thermal decomposition of cellulose and a binder, wherein the substance accelerating the thermal decomposition of cellulose is capable of causing an irreversible color change of the wrapping paper due to the thermal decomposition of cellulose in the paper which is discernible by the naked eye upon heating the wrapping paper to a temperature of at least 130° C. for 5 min, wherein, in the case in which the mean air permeability of the wrapping paper is 10 $cm^3/(cm^2 \cdot min \cdot kPa)$ or more, said composition is only applied in sections which cover at least 0.5% and at most 70% of the surface of the wrapping paper, and wherein said sections are arranged on the wrapping paper such that at least one of the following criteria (1), (2) is fulfilled:

(1) if the mean air permeability of the wrapping paper is at least 10 $cm^3/(cm^2 \cdot min \cdot kPa)$ and at most 20 $cm^3/(cm^2 \cdot min \cdot kPa)$, then the standard deviation of the air permeability is at most 6 cm3$/(cm^2 \cdot min \cdot kPa)$, wherein the standard deviation is determined from ten measurements with said 2 mm×15 mm measuring head on non-overlapping areas located close to each other, and if the mean air permeability of the wrapping paper is at least 20 $cm^3/(cm^2 \cdot min \cdot kPa)$ and at most 200 $cm^3/(cm^2 \cdot min \cdot kPa)$, then the coefficient of variation of the air permeability is at most 30%, wherein the coefficient of variation is defined as the quotient of said standard deviation and the mean value of the ten measurements from which the standard deviation is determined, (2) the sections to which the composition is applied are shaped such that each imaginary circle with a diameter of D mm on the wrapping paper contains at least one area to which the composition has not been applied, wherein the diameter D in mm is calculated from the mean air permeability x in $cm^3/(cm^2 \cdot min \cdot kPa)$ by $$D = D_{max} - \frac{(D_{max} - D_{min}) \cdot (x - 10)}{190} \text{ wherein}$$

$$D_{max} = 12 \text{ mm and } D_{min} = 6 \text{ mm},$$

wherein the mean air permeability x corresponds to said mean value from ten measurements at randomly selected positions on the wrapping paper.

18. Rod-shaped, aerosol-generating article according to claim 17, wherein the aerosol-generating material is configured to be heated to a maximum temperature of at least 120° C. and at most 500° C.

19. Rod-shaped, aerosol-generating article according to claim 17, wherein said wrapping paper has a basis weight of at least 15 $g/m^2$ and at most 45 $g/m^2$.

20. Rod-shaped, aerosol-generating article according to claim 17, in which the pulp fibers make up at least 60% of the mass of the wrapping paper.

21. Rod-shaped, aerosol-generating article according to claim 17, in which at least a portion of the pulp fibers is bleached, wherein the proportion of unbleached pulp fibers, if present, is at most 50% of the mass of the pulp fibers.

22. Rod-shaped, aerosol-generating article according to claim 17, wherein said wrapping paper contains one or more fillers, wherein the total amount of filler makes up at least 10% and at most 38% of the mass of the wrapping paper.

23. Rod-shaped, aerosol-generating article according to claim 17, wherein said wrapping paper does not contain substances accelerating the decomposition of the cellulose outside the sections to which the composition has been applied, or solely in an amount which does not exceed 0.5% of the mass of the wrapping paper per unit area.

24. Rod-shaped, aerosol-generating article according to claim 17, in which the amount of binder which is applied in sections of the wrapping paper is at most 5% of the mass of the wrapping paper per unit area.

25. Rod-shaped, aerosol-generating article according to claim 17, in which the substance accelerating the thermal decomposition of cellulose is contained in an amount of at least 0.3 $g/m^2$ and at most 7.0 $g/m^2$ in the areas of the wrapping paper to which the composition containing has been applied.

26. Rod-shaped, aerosol-generating article according to claim 17, in which the ratio of the amount of the substance accelerating the thermal decomposition of cellulose in $g/m^2$ with respect to the area to which the composition containing it has been applied and the amount of pulp fibers in the wrapping paper in $g/m^2$ is at least 0.05 and at most 0.45.

27. Rod-shaped, aerosol-generating article according to claim 17, wherein the substance accelerating the thermal decomposition of cellulose is one or more of the chemical compounds selected from the group consisting of citrates, malates, tartrates, acetates, nitrates, succinates, fumarates, gluconates, glycolates, lactates, oxylates, salicylates, α-hydroxy caprylates, hydrogen carbonates, carbonates, chlorides, polyphosphates, phosphonates, phosphates, and combinations thereof.

28. Rod-shaped, aerosol-generating article according to claim 27, wherein the substance accelerating the thermal decomposition of cellulose is one or more of the chemical compounds selected from the group consisting of trisodium citrate, tripotassium citrate, monoammonium phosphate, sodium acetate, potassium acetate, sodium hydrogen carbonate, potassium hydrogen carbonate, sodium carbonate, potassium carbonate, sodium tartrate, potassium sodium tartrate, potassium formate, sodium formate, sodium nitrate, potassium nitrate, and combinations thereof.

29. Rod-shaped, aerosol-generating article according to claim 17, wherein, in the case in which the mean air permeability of the wrapping paper is at least 10 $cm^3/(cm^2 \cdot min \cdot kPa)$ and at most 200 $cm^3/(cm^2 \cdot min \cdot kPa)$, the sections to which said composition is applied are shaped such that they make up at least 1% and at most 60% of the surface of the wrapping paper.

30. Rod-shaped, aerosol-generating article according to claim 17, in which, in the case in which the mean air permeability of the wrapping paper is at least 10 $cm^3/(cm^2 \cdot min \cdot kPa)$ and at most 200 $cm^3/(cm^2 \cdot min \cdot kPa)$, the sections are shaped such that at least one of the following two criteria (3), (4) is fulfilled:

(3) if the mean air permeability of the wrapping paper is greater than 10 $cm^3/(cm^2 \cdot min \cdot kPa)$ and less than 20 $cm^3/(cm^2 \cdot min \cdot kPa)$, then the standard deviation of the air permeability is at most 5.5 $cm^3/(cm^2 \cdot min \cdot kPa)$, and if the mean air permeability of the wrapping paper is at least 20 $cm^3/(cm^2 \cdot min \cdot kPa)$ and at most 200 $cm^3/(cm^2 \cdot min \cdot kPa)$, then the coefficient of variation of the air permeability is at most 25%, or (4) the sections to which the composition is applied are shaped such that each imaginary circle with a diameter of D mm on the wrapping paper contains at least one area to which the composition is not applied, wherein the diameter D in mm is calculated from the mean air permeability x in $cm^3/(cm^2 \cdot min \cdot kPa)$ by $$D = D_{max} - \frac{(D_{max} - D_{min}) \cdot (x - 10)}{190} \text{ and wherein}$$

$$D_{max} = 12 \text{ mm and } D_{min} = 6 \text{ mm.}$$

31. Rod-shaped, aerosol-generating article according to claim 17, in which, in the case in which the mean air permeability of the wrapping paper is at least 0 $cm^3/(cm^2 \cdot min \cdot kPa)$ and at most 10 $cm^3/(cm^2 \cdot min \cdot kPa)$, the composition is applied to the entire surface or in sections, wherein, in the case of an application in sections, the sections to which the composition is applied to the wrapping paper are shaped such that each imaginary circle with a diameter of 12 mm on the wrapping paper contains at least one area to which the composition has not been applied.

32. Rod-shaped, aerosol-generating article according to claim 17, in which, in the case in which the mean air permeability of the wrapping paper is at least 0 $cm^3/(cm^2 \cdot min \cdot kPa)$ and at most 10 $cm^3/(cm^2 \cdot min \cdot kPa)$ and the composition is only applied in sections, the sections to which said composition is applied are shaped such that they make up at least 0.5% and at most 70% of the surface of the wrapping paper.

33. Process for manufacturing the wrapping paper of claim 1 for aerosol-generating articles, comprising the steps A to C:

A-providing a base wrapping paper,

B-applying a composition to the base wrapping paper, and

C-drying the wrapping paper obtained in step B, wherein the wrapping paper obtained after step C comprises pulp fibers, wherein at least 50% of the mass of the wrapping paper is formed by the pulp fibers, and the wrapping paper obtained after step C has a mean air permeability of at least 10 $cm^3/(cm^2 \cdot min \cdot kPa)$ and at most 200 $cm^3/(cm^2 \cdot min \cdot kPa)$, measured with a 2 mm×15 mm measuring head in accordance with ISO 2965:2009, and in step B, a composition is applied which comprises a substance accelerating the thermal decomposition of cellulose and a binder, wherein the substance accelerating the thermal decomposition of cellulose is capable of causing an irreversible color change of the wrapping paper due to the thermal decomposition of cellulose in the paper which is discernible by the naked eye upon heating the wrapping paper to a temperature of at least 130° C. for 5 min, and wherein, in step B the composition is applied only in sections which cover at least 0.5% and at most 70% of the surface of the wrapping paper, and wherein, the wrapping paper obtained in step C fulfills the following criterion (1):

(1) if the mean air permeability of the wrapping paper obtained in step C is at least 10 $cm^3/(cm^2 \cdot min \cdot kPa)$ and at most 20 $cm^3/(cm^2 \cdot min \cdot kPa)$, then the standard deviation of the air permeability is at most 6 $cm^3/(cm^2 \cdot min \cdot kPa)$; and if the mean air permeability of the wrapping paper obtained in step C is at least 20 $cm^3/(cm^2 \cdot min \cdot kPa)$ and at most 200 $cm^3/(cm^2 \cdot min \cdot kPa)$, then the coefficient of variation of the air permeability is at most 30%.

34. Process according to claim 33, in which the composition applied in step B comprises a substance accelerating the thermal decomposition of cellulose, a binder and a solvent, wherein the solvent is water.

35. Process according to claim 33, in which the substance accelerating the thermal decomposition of cellulose contained in the composition of step B is one or more of the chemical compounds selected from the group consisting of citrates, malates, tartrates, acetates, nitrates, succinates, fumarates, gluconates, glycolates, lactates, oxylates, salicylates, α-hydroxy caprylates, hydrogen carbonates, carbonates, chlorides, polyphosphates, phosphonates, phosphates, and combinations thereof.

36. Process according to claim 33, in which the composition which is applied to the base wrapping paper in step B contains the substance accelerating the thermal decomposition of cellulose in an amount of at least 3% and at most 30% with respect to the mass of the composition.

37. Process according to claim 33, in which the composition which is applied to the wrapping paper in step B contains the binder in an amount of at least 0.1% and at most 15% with respect to the amount of composition.

38. Process according to claim 33, in which during drying in step C, a solvent is substantially removed from the composition and the applied dried composition is afterwards present in an amount of at least 0.2 g/$m^2$ and at most 8 g/$m^2$ with respect to the area to which the composition was actually applied.

39. Process according to claim 33, in which the application of the composition in step B is carried out by printing or spraying.

40. Process according to claim 33, in which the drying process in step C is carried out by contact with one or more heated cylinders, by contact with hot air, by infra-red radiation, microwave radiation or combinations thereof.

41. Process according to claims 33, in which the process comprises further additional steps D and E following step C, wherein in step D, water is applied to the entire surface of the wrapping paper obtained in step C and in step E, the wrapping paper from step D is dried by contact with one or more heated cylinders.

42. Process according to claim 35, in which the substance accelerating the thermal decomposition of cellulose contained in the composition of step B is one or more of the chemical compounds selected from the group consisting of trisodium citrate, tripotassium citrate, monoammonium phosphate, sodium acetate, potassium acetate, sodium hydrogen carbonate, potassium hydrogen carbonate, sodium carbonate, potassium carbonate, sodium tartrate, potassium sodium tartrate, potassium formate, sodium formate, sodium nitrate, potassium nitrate, and combinations thereof.

43. Process according to claim 38, in which during drying in step C, a solvent is substantially removed from the composition and the applied dried composition is afterwards present in an amount of at least 1 g/$m^2$ and at most 5 g/$m^2$ with respect to the area to which the composition was actually applied.

* * * * *